US005256492A

United States Patent [19]

[11] Patent Number: 5,256,492

[45] Date of Patent: Oct. 26, 1993

Hirota et al.

[54] THERMAL TRANSFER RECORDING SHEET

[75] Inventors: Takao Hirota, Machida; Yukichi Murata, Sagamihara; Tsutomu Taki, Tokyo; Hideo Shinohara, Yokohama, all of Japan

[73] Assignee: Mitsubishi Kasei Corporation, Tokyo, Japan

[21] Appl. No.: 562,629

[22] Filed: Aug. 3, 1990

[30] Foreign Application Priority Data

Aug. 7, 1989 [JP] Japan .................................. 1-204408
Apr. 13, 1990 [JP] Japan .................................. 2-98128

[51] Int. Cl.[5] .............................................. B32B 9/00

[52] U.S. Cl. .................................. 428/524; 428/195; 428/484; 428/488.1; 428/488.4; 428/913; 428/914

[58] Field of Search .................... 428/195, 484, 488.1, 428/488.4, 913, 914, 524

[56] References Cited

U.S. PATENT DOCUMENTS 4,707,406 11/1987 Inaba et al. .......................... 428/913
4,771,035 9/1988 Murata et al. ....................... 428/195
4,847,238 7/1989 Jongewaard et al. .............. 428/195
4,954,553 9/1990 Johnson ............................. 428/418

OTHER PUBLICATIONS

G. Odian, "Principles of Polymerization," 2nd ed. Wiley: New York, 1981. pp. 20-22.

Patent Abstracts of Japan vol. 5, No. 135 (M-85) (807) 27 Aug. 1981, & JP-A-56 69193 (Konishiroku Photo Industry Company Limited) 10 Jun. 1981.

Patent Abstracts of Japan, vol. 10 No. 368 (M-543) (2425) Dec. 9, 1986, & JP-A-61 162390 (Konishiroku Photo Industry Company Limited) Jul. 23, 1986.

Patent Abstracts of Japan vol. 8, No. 124 (M-301) (1561) Jun. 9, 1984, & JP-A-59 29196 (Pilot Pen K.K.) Feb. 16, 1984.

*Primary Examiner*—Patrick J. Ryan
*Assistant Examiner*—W. Krynski
*Attorney, Agent, or Firm*—Oblon, Spivak, McClelland, Maier & Neustadt

[57] ABSTRACT

A thermal transfer recording sheet comprising a base film and an ink layer comprising at least a heat transferable colorant and a binder resin, formed on one side of the base film, wherein the binder resin is a phenoxy resin having repeating structural units of the following formula (I):

(I)

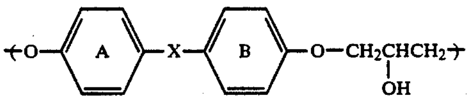

wherein X is a bivalent group represented by

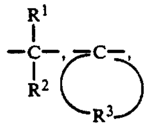

—O—, —S—, —SO— or —$SO_2$—, each of $R^1$ and $R^2$ is a hydrogen atom, an alkyl group or an aryl group, $R^3$ is an alkylene group, and each of benzene rings A and B may have an alkyl group or a halogen atom as a substituent.

10 Claims, No Drawings

THERMAL TRANSFER RECORDING SHEET

The present invention relates to a thermal transfer recording sheet.

In a colorant-transferring type thermal transfer recording system in which a thermal transfer recording sheet comprising a base film and an ink layer composed mainly of a heat transferable colorant and a binder resin formed on one side of the base film, is heated by a heating means such as a thermal head to transfer the colorant on the thermal transfer recording sheet to an image receiving record sheet, the thermal transfer recording sheet is required to have the following properties:

1) At the time of transfer recording, it does not fuse or stick to the image receiving record sheet, and after the recording, it can readily by released from the record sheet and provides records with excellent contrast.

2) at the time of transfer recording, the heat transferability of the colorant in the ink layer is good, and the transferability of the colorant from the thermal transfer recording sheet to the image receiving record sheet is good.

3) During storage of the thermal transfer recording sheet, the colorant is stable in the ink layer and does not undergo chemical or physical changes.

For such properties of the thermal transfer recording sheet, it is important to select the binder resin to be used for forming the ink layer. Various binder resins have been proposed but none of them is fully satisfactory.

It is an object of the present invention to provide a thermal transfer recording sheet which does not fuse or stick to the record sheet and provides good transferability of the colorant at the time of transfer recording and which has good stability during storage.

The present invention provides a thermal transfer recording sheet comprising a base film and an ink layer comprising at least a heat transferable colorant and a binder resin, formed on one side of the base film, wherein the binder resin is a phenoxy resin having repeating structural units of the following formula (I):

(I)

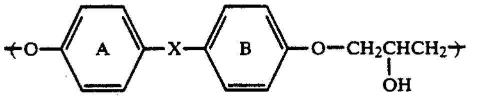

wherein X is a bivalent group represented by

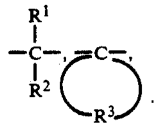

—O—, —S—, —SO— or —$SO_2$—, each of $R^1$ and $R^2$ is a hydrogen atom, an alkyl group or an aryl group, $R^3$ is an alkylene group, and each of benzene rings A and B may have an alkyl group or a halogen atom as a substituent.

Now, the present invention will be described in detail with reference to the preferred embodiments.

The phenoxy resin useful for the present invention can be obtained by reacting at least one phenol compound selected from the group represented by the following formula (II) with epichlorohydrin by a usual method:

(II)

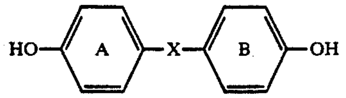

wherein X and rings A and B are as defined above with respect to the formula (I).

Here, specific examples of the phenol compound of the formula (II) include bis(hydroxyaryl)alkanes such as bis(4-hydroxyphenyl)diphenylmethane, bis(4-hydroxyphenyl)phenylmethane, 1,1-bis(4-hydroxyphenyl)-1-phenylethane, 1,1-bis(4-hydroxyphenyl)-1-phenylpropane, 1,1-bis(4-hydroxyphenyl)-1-phenylbutane, bis(4-hydroxyphenyl)methane, 1,1 bis(4-hydroxyphenyl)ethane, 2,2-bis(4-hydroxyphenyl)propane, 2,2-bis(4-hydroxyphenyl)butane, 2,2-bis(4-hydroxy-3-methylphenyl)propane, 2,2-bis(4-hydroxy-3,5-dimethylphenyl)propane and 2,2-bis(4-hydroxy-3,5-dibromophenyl)propane; bis(hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethylphenyl sulfoxide; and dihydroxydiaryl sulfones such as 4,4'-dihydroxydiphenyl sulfone and 4,4'-dihydroxy-3,3'-dimethyldiphenyl sulfone. Among them, preferred is the one wherein X is —$SO_2$— or

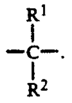

Particularly preferred is a phenoxy resin having repeating structural units of the following formula:

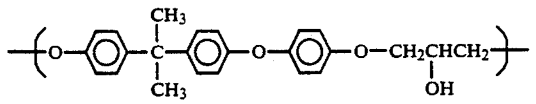

The phenoxy resin to be used in the present invention preferably has a weight average- molecular weight of from 10,000 to 100,000, more preferably from 10,000 to 60,000, in view of e.g. coating properties.

A particularly preferred phenoxy resin to be used in the present invention is a known resin and can be produced by the condensation of bisphenol A with epichlorohydrin as shown below.

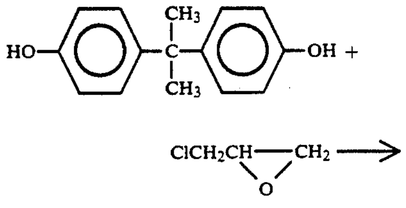

-continued

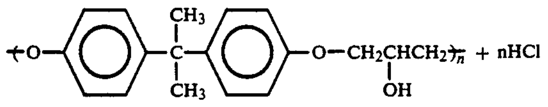

A phenoxy resin having such structural units has excellent heat resistance (glass transition temperature = 100° C.), whereby fusion to the surface of the record sheet hardly takes place. Further, it is excellent in the solubility in the solvent as described hereinafter and thus provides excellent coating properties. The molecular weight is preferably from 25,000 to 30,000.

To prepare the thermal transfer recording sheet of the present invention, the above mentioned phenoxy resin and the heat transferable colorant are dissolved in a suitable solvent to prepare an ink, and this ink is coated on a base film, followed by drying.

The heat transferable colorant includes, for example, nonionic dyes of azo type, anthraquinone type, azomethine type, methine type, indoaniline type, naphthoquinone type, quinophthalone type and nitro type. To the ink, in addition to the above phenoxy resin and heat transferable colorant, organic and inorganic fine particles, a dispersant, an antistatic agent, an antiblocking agent, a defoaming agent, an antioxidant and a viscosity-controlling agent may be incorporated, as the case requires.

The solvent useful for the preparation of the ink includes, for example, ketones such as acetone, methyl ethyl ketone or cyclohexanone; glycol ethers such as cellosolve, butylcellosolve, butylcarbitol and ethylene glycol dimethyl ether; glycol ether esters such as cellosolve acetate or butylcellosolve acetate; a cyclic ethers such as tetrahydrofuran and dioxane; and other organic solvents such as N,N-dimethylformamide, N-methylpyrrolidone dimethyl sulfoxide, toluene, xylene and chlorobenzene. Preferred are ketones and cyclic ethers.

The concentration of the above phenoxy resin in the ink is usually within a range of from 2 to 50%, preferably from 5 to 30%, and the concentration of the heat transferable colorant in the ink is usually within a range of from 1 to 30%, preferably from 2.5 to 20%.

As the base film, thin paper such as condenser paper or glassine paper, or a film of heat resistant plastic such as polyamide, polyimide, cellophane or polyester, may be employed. Such a base film may have a heat resistant protective layer of a heat resistant resin formed by a conventional method on the rear side of the ink layer, as the case requires, in order to improve the running properties of the thermal head.

Further, to improve the adhesion of the ink layer, to prevent tinting of the colorant on the base film or to improve the heat conductance from the base film to the ink layer, the base film may have the ink-coating side treated with a resin such as a water-soluble polyester resin, a cellulose resin, a polyvinyl alcohol, a urethane resin or a polyvinylidene chloride, or provided with a thin aluminum layer.

The thickness of such a base film is preferably from 3 to 25 μm.

Coating of the ink on such a base film can be conducted, for example, using a gravure coater, a reverse roll coater, a wire bar coater or an air doctor coater as disclosed in e.g. "Coating methods" edited by Yuji Harasaki (1979) published by Maki Shoten.

The thickness of the ink layer is usually within a range of from 0.01 to 5 μm as the dried layer thickness.

To conduct recording by means of the thermal transfer recording sheet of the present invention, an image receiving record sheet is overlaid on the ink layer of the thermal transfer recording sheet, and recording is conducted by heating the thermal transfer recording sheet from the rear side of the ink layer by a thermal head which generates heat in response to electric signals corresponding to the image information. As the heating means, infrared rays or laser beams may also be employed.

Further, the ink composition used in the present invention may be coated on an electrically conductive film capable of being electrically heated, to obtain an electrically operable thermal transfer recording sheet.

As an image-receiving record sheet (hereinafter referred to simply as a record sheet) to be used in combination with the thermal transfer recording sheet of the present invention, a record sheet commonly employed in a usual thermal transfer recording system, can be used. Usually, the record sheet comprises a substrate and a color-forming layer formed on the surface of the substrate. To facilitate the feeding of the record sheet during the thermal transfer recording, it is preferred to provide a backing layer on the rear side of the substrate. In some cases, an interlayer may be provided between the substrate and the color-forming layer, or between the substrate and the backing layer. Further, an overcoating layer may further be provided on the color-forming layer.

As the substrate, various papers made of cellulose fibers or various synthetic papers or plastic films made of synthetic resins, may be mentioned. The substrate may also be a laminate of such materials with an adhesive layer or a releasing layer interposed therebetween.

The color-forming layer is a layer which receives a colorant transferred from the thermal transfer recording sheet and forms an image, and it is formed usually by employing a thermoplastic resin having good affinity with a colorant, as the main component. For example, a linear saturated polyester resin, an acrylic resin and a vinyl resin such as polyvinyl chloride or polyvinyl acetate, are preferred since they are excellent in the affinity with colorants.

The color-forming layer usually contains various releasing agents or inorganic or organic fine particles in order to improve the releasing properties of the record sheet from the color sheet after the transfer recording. The color-forming layer may contain in addition to the above components further additives such as an ultraviolet absorber, a photostabilizer, an antioxidant, a fluorescent brightener and an antistatic agent, as the case requires.

To the record sheet, treatment may be applied to make it writable. The record sheet may further have markings for positioning.

Now, the present invention will be described in further detail with reference to Examples. However, it should be understood that the present invention is by no means restricted to such specific Examples.

EXAMPLE 1

(a) Preparation of an Ink

An ink having the following composition was prepared. The resin and the dye were completely dissolved.

| | |
|---|---|
| Phenoxy resin* | 10 parts by weight |
| Dye of the structural formula given below | 6 parts by weight |
| Methyl ethyl ketone | 84 parts by weight |
| Total | 100 parts by weight |

*"UCAR phenoxy resin PKHH" (weight average molecular weight: about 30,000), maufactured by Union Carbide Japan

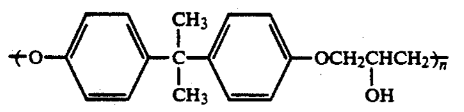

Structural formula of the dye:

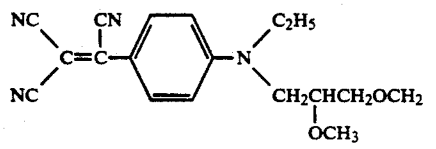

(c) Preparation of a Thermal Transfer Recording Sheet

On a biaxially stretched polyethyleneterephthalate film (thickness: 6 μm) having the rear side of the ink-coating side treated for heat resistance and lubricating properties, as a base film, the ink prepared in the above step (a) was coated by a wire bar coater in a wet film thickness of 6 μm and dried to obtain a thermal transfer recording sheet. It was possible to obtain a completely transparent and uniformly magenta colored thermal transfer recording sheet without crystallization of the dye even after drying the ink.

(c) Transfer Recording Test and the Results

The thermal transfer recording sheet prepared in the above step (b), was overlaid on a record sheet having on its surface a color-forming layer containing a polyester resin, a silicon releasing agent and fine silica, and recording was conducted using a thermal head having a heat generating resistor density of 8 dots/mm by an application of a power of 0.2 W/dot for from 1 to 10 msec. As a result, with each transfer recording sheet, no fusion to the record sheet was observed, no transfer of the binder resin of the transfer recording sheet to the record sheet was observed. After the recording, the transfer recording sheet was readily released from the record sheet.

Further, the records thereby obtained showed a clear magenta color with excellent resolution of dots and exhibited excellent gradation corresponding to the applied time with the maximum color density of 2.0. The color density was measured by "Densitomater TR-927 Model" manufactured by Macbeth Company, USA.

Further, to examine the storage stability of the above thermal transfer recording sheet, the sheet was left to stand for one week in an environment at 60° C. under a relative humidity of 60%, and then a transfer recording test was conducted under the same conditions as above, whereby transfer records with excellent gradation were obtained, and no decrease of the color density of the records was observed.

EXAMPLE 2

The preparation of an ink, the preparation of a thermal transfer recording sheet and the transfer recording test were conducted in the same manner as in Example 1 except that in the preparation of the ink, a phenoxy resin having the same structure as used in Example 1 but with a weight average molecular weight of about 35,000 ("UCAR phenoxy resin PKHJ" manufactured by Union Carbide Japan) was used. As a result, records of a clear magenta color with excellent gradation were obtained with the maximum color density of 1.9.

Further, the storage stability of the thermal transfer recording sheet was tested in the same manner as in Example 1, whereby no decrease in the density of the transfer records was observed, and the stability was excellent.

EXAMPLE 3

The preparation of an ink, the preparation of a thermal transfer recording sheet and the transfer recording test were conducted in the same manner as in Example 1 except that in the preparation of the ink a phenoxy resin having the same structure as used in Example 1 but with a weight average molecular weight of about 25,000 ("UCAR phenoxy resin PKHJ" manufactured by Union Carbide Japan) was used. As a result, records of a sharp magenta color with excellent gradation were obtained with the maximum color density of 2.0.

Further, the storage stability of the thermal transfer recording sheet was tested in the same manner as in Example 1, whereby no decrease in the density of the transfer records was observed, and the stability was excellent.

EXAMPLE 4

The preparation of an ink, the preparation of a thermal transfer recording sheet and the transfer recording test were conducted in the same manner as in Example 1 except that in the preparation of the ink, a dye having the following formula:

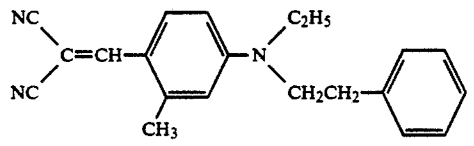

was used as the colorant. As a result, records of a clear yellow color with excellent gradation were obtained with the maximum color density of 1.8.

Further, the storage stability of the thermal transfer recording sheet was tested in the same manner as in Example 1, whereby no decrease in the density of the transfer records was observed, and the stability was excellent.

EXAMPLE 5

(a) Preparation of an Ink

An ink having the following composition was prepared. The resin and the dye were completely dissolved.

| | |
|---|---|
| Phenoxy resin* | 10 parts by weight |
| Dye of the following structural formula | 6 parts by weight |
| Dioxane | 84 parts by weight |
| Total | 100 parts by weight |

*"YPB-43C" (average molecular weight: about 60,000), manufactured by Toto Kasei K. K.)

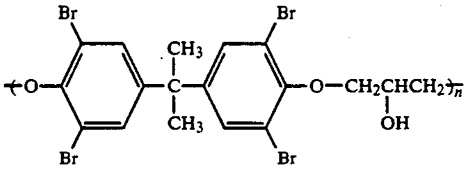

Structural of the dye:

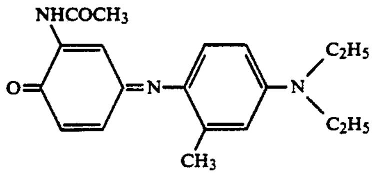

The preparation of a thermal transfer recording sheet and the transfer recording test were conducted in the same manner as in Example 1, whereby records of a clear cyan color with excellent gradation were obtained with the maximum color density of 2.0.

Further, the storage stability of the thermal transfer recording sheet was tested in the same manner as in Example 1, whereby no decrease in the density of the in Example 1, whereby no decrease in the density of the transfer records was observed, and the stability was excellent.

EXAMPLE 6

The preparation of an ink was conducted in the same manner as in Example 5 except that in the preparation of the ink, a resin having the following structure was used as the phenoxy resin and cyclohexanone was used as the solvent.

The Structural Formula of the Phenoxy Resin Used

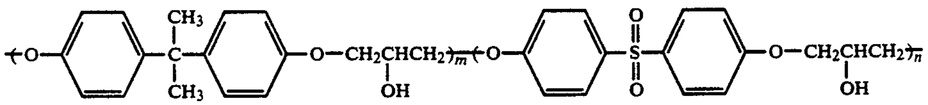

"YPS-007" (Tg: 131° C.), manufactured by Toto Kasei K. K. The preparation of the thermal transfer recording sheet and the transfer recording test were conducted in the same manner as in Example 1, whereby records of a clear cyan color with excellent gradation were obtained with the maximum color density of 1.9.

EXAMPLES 7 TO 14

The preparation of inks, the preparation of thermal transfer recording sheets and the transfer recording tests were conducted in the same manner as in Example 1 except that in the preparation of the inks, the dyes as identified in Table 1 were used as the colorant, whereby records having the colors and the maximum color densities as identified in Table 1 were obtained, as identified in Table 1 were obtained.

Further, the storage stability of the thermal transfer recording sheets was tested in the same manner as in Example 1, whereby no decrease in the densities of all the transfer records was observed, and the stability was excellent in each case.

TABLE 1

| No. | Structural formula of the dye | Color | Maximum color density |
|---|---|---|---|
| 7 | 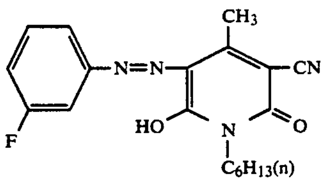 | Yellow | 1.7 |
| 8 | 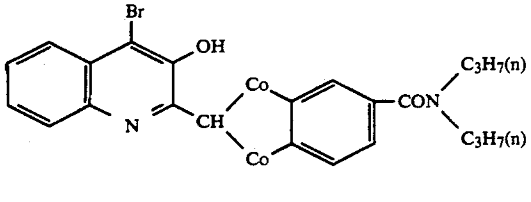 | Yellow | 1.5 |
| 9 | 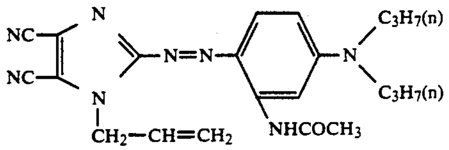 | Magenta | 1.7 |

TABLE 1-continued

| No. | Structural formula of the dye | Color | Maximum color density |
|---|---|---|---|
| 10 | 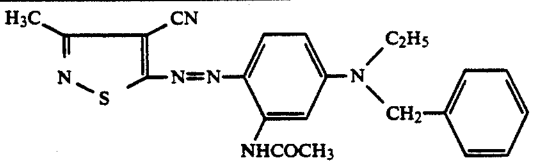 | Magenta | 1.6 |
| 11 | 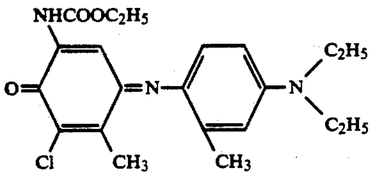 | Cyan | 1.6 |
| 12 | 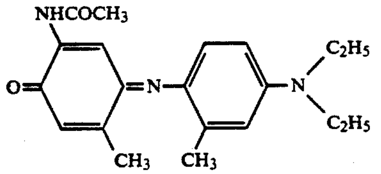 | Cyan | 1.8 |
| 13 | 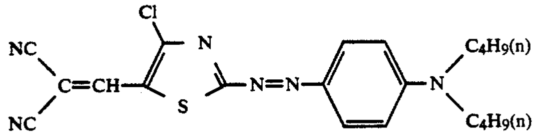 | Cyan | 1.6 |
| 14 | 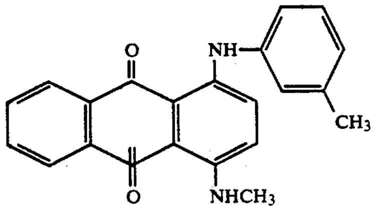 | Cyan | 1.4 |

As described in the foregoing, the present invention provides a thermal transfer recording sheet which does not fuse or stick to the record sheet and which provides excellent fixing properties of the colorant and excellent storage stability.

We claim:

1. A thermal transfer recording sheet comprising a base film and an ink layer comprising at least a heat transferable colorant and a binder resin, formed on one side of the base film, wherein the binder resin consists essentially of a phenoxy resin having repeating structural units of the following formula (I) and a glass transition temperature of at least about 100° C.:

(I)

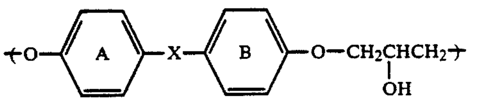

wherein X is a bivalent group represented by

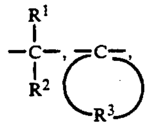

—O—, —S—, —SO— or —$SO_2$—, each of $R^1$ and $R^2$ is a hydrogen atom, an alkyl group or an aryl group, $R^3$ is an alkylene group, and each of benzene rings A and B may have an alkyl group or a halogen atom as a substituent.

2. The thermal transfer recording sheet according to claim 1, wherein X in the formula (I) is

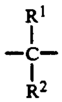 or —$SO_2$—.

3. The thermal transfer recording sheet according to claim 1, wherein the binder resin has a weight average molecular weight of from 10,000 to 100,000.

4. The thermal transfer recording sheet according to claim 1, wherein the proportion of the colorant to the binder resin in the ink layer is from 10 to 200% by weight.

5. The thermal transfer recording sheet according to claim 1, wherein the proportion of the colorant to the binder resin in the ink layer is from 30 to 150%.

6. The thermal transfer recording sheet according to claim 1, wherein the colorant in the ink layer is selected from the group consisting of nonionic dyes of azo group containing dyes, anthraquinone group containing dyes, azomethine group containing dyes, methine group containing dyes, indoaniline group containing dyes, naphthoquinone group containing dyes, quinophthalone group containing dyes and nitro group containing dyes.

7. The thermal transfer recording sheet according to claim 1, wherein the ink layer has a thickness of from 0.01 to 5 $\mu$m.

8. The thermal transfer recording sheet according to claim 1, the ink layer has a thickness of from 0.1 to 3 $\mu$m.

9. The thermal transfer recording sheet according to claim 1, wherein X in the formula (I) is

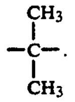

10. The thermal transfer recording sheet according to claim 1, wherein the binder resin has a weight average molecular weight of from 10,000 to 60,000.

* * * * *